United States Patent
Nelms et al.

(10) Patent No.: US 11,522,358 B2
(45) Date of Patent: Dec. 6, 2022

(54) ISOLATION OF PROTECTIVE FUNCTIONS IN ELECTRICAL POWER SYSTEMS

(71) Applicant: Schweitzer Engineering Laboratories, Inc., Pullman, WA (US)

(72) Inventors: Lisa Gayle Nelms, Colfax, WA (US); Dean G. Stevens, Pullman, WA (US); Paul Stoaks, Moscow, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 271 days.

(21) Appl. No.: 16/876,268

(22) Filed: May 18, 2020

(65) Prior Publication Data

US 2021/0359508 A1    Nov. 18, 2021

(51) Int. Cl.
| | | |
|---|---|---|
| H02H 7/20 | (2006.01) | |
| G05B 19/042 | (2006.01) | |
| H02H 1/00 | (2006.01) | |
| G06F 12/14 | (2006.01) | |
| G06F 13/16 | (2006.01) | |

(52) U.S. Cl.
CPC ........... *H02H 7/20* (2013.01); *G05B 19/0428* (2013.01); *G06F 12/14* (2013.01); *G06F 13/1657* (2013.01); *H02H 1/0092* (2013.01); *G05B 2219/24215* (2013.01)

(58) Field of Classification Search
None
See application file for complete search history.

(56) References Cited

U.S. PATENT DOCUMENTS

| | | | |
|---|---|---|---|
| 4,535,306 A | 8/1985 | Yamaguchi | |
| 4,546,486 A | 10/1985 | Evans | |
| 4,768,178 A | 8/1988 | Conklin | |
| 4,808,884 A | 2/1989 | Hull | |
| 5,103,466 A | 4/1992 | Bazes | |
| 5,235,590 A | 8/1993 | Taguchi | |
| 5,363,377 A | 11/1994 | Sharpe | |
| 5,793,869 A | 8/1998 | Claflin | |
| 5,867,356 A * | 2/1999 | Duggal | H01H 9/542 361/13 |
| 6,456,831 B1 | 9/2002 | Tada | |
| 6,678,134 B2 | 1/2004 | Sugiura | |
| 6,754,210 B1 | 6/2004 | Ofek | |

(Continued)

*Primary Examiner* — Charles J Choi
(74) *Attorney, Agent, or Firm* — Gregory C. Baker (57) ABSTRACT

Systems, devices, and methods include protective functions in an electrical power system. For example, a processing subsystem may include a first processor and a second processor. The first processor and the second processor may operate independently. A memory subsystem may comprise a first memory section and a second memory section. A memory management subsystem may enable memory access between the first processor and the first memory section and disable memory access between the first processor and the second memory section. The memory management subsystem may further enable memory access between the second processor and the second memory section and disable memory access between the second processor and the first memory section. A protection subsystem may include the first processor and the first memory section and enable a protection function. The second processor and the second memory section may provide a second function that operates independently of the protection function.

20 Claims, 4 Drawing Sheets

(56) References Cited

U.S. PATENT DOCUMENTS

| | | |
|---|---|---|
| 6,847,691 B2 | 1/2005 | Torikoshi |
| 6,859,742 B2 | 2/2005 | Randall |
| 6,891,441 B2 | 5/2005 | Rochow |
| 6,937,683 B1 | 8/2005 | Ratzel |
| 6,947,269 B2 | 9/2005 | Lee |
| 7,239,581 B2 | 7/2007 | Delgado |
| 7,272,201 B2 | 9/2007 | Whitehead |
| 7,283,568 B2 | 10/2007 | Robie |
| 7,463,467 B2 | 12/2008 | Lee |
| 7,571,216 B1 | 8/2009 | Mcrae |
| 7,617,408 B2 | 11/2009 | Frazier |
| 7,701,683 B2 | 4/2010 | Morris |
| 8,351,433 B2 | 1/2013 | Morris |
| 2001/0023464 A1 | 9/2001 | Deck |
| 2002/0069299 A1 | 6/2002 | Rosener |
| 2002/0080808 A1 | 6/2002 | Leung |
| 2004/0196855 A1 | 10/2004 | Davies |
| 2007/0002746 A1 | 1/2007 | Shankar |
| 2007/0127487 A1 | 6/2007 | Kim |
| 2007/0147415 A1 | 6/2007 | Marusca |
| 2008/0071482 A1 | 3/2008 | Zweigle |
| 2008/0235355 A1 | 9/2008 | Spanier |
| 2009/0141727 A1 | 6/2009 | Brown |
| 2009/0260083 A1 | 10/2009 | Szeto |
| 2009/0300165 A1 | 12/2009 | Tuckey |
| 2010/0195763 A1 | 8/2010 | Lee |
| 2011/0242709 A1* | 10/2011 | Ikeda ............. B60L 58/14 361/18 |
| 2012/0078555 A1 | 3/2012 | Banhegyesi |
| 2019/0041938 A1* | 2/2019 | Zupanc ............. H02J 9/06 |
| 2019/0332533 A1* | 10/2019 | Fu ............. G06F 12/0246 |
| 2020/0218809 A1* | 7/2020 | Lam ............. G06F 21/554 |
| 2021/0191854 A1* | 6/2021 | Yang ............. G06F 11/327 |

* cited by examiner

ISOLATION OF PROTECTIVE FUNCTIONS IN ELECTRICAL POWER SYSTEMS

TECHNICAL FIELD

This disclosure relates to systems and methods for isolation of certain functions of an electrical power system from other functions deemed of lesser importance. For example, systems and methods according to the present disclosure may be used to separate functions related to the protection of an electrical power distribution system from other less important or less critical functions.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Electric power delivery systems are widely used to generate, transmit, and distribute electric power to loads, and serve as an important part of critical infrastructure. Power systems and components are often monitored and protected by intelligent electronic devices (IEDs) and systems of IEDs that obtain electric power system information from the equipment and monitor, automate, and provide protective actions for the power system. Several IEDs may be in communication to facilitate sharing of information for station-wide, area-wide, or even system-wide protection.

For example, protection devices or relays may be IEDs that provide protective functions (e.g., detection and/or mitigation of faults or potential faults, such as overcurrent, differential, directional, distance, undervoltage, voltage regulation, bus protection, overfrequency, underfrequency, traveling wave, and/or other protection operations) to one or more portions of the electric power system. Stated in another way, a protective device or relay may be an IED that executes one or more operations to monitor and/or protect one or more portions of the electric power system and to decrease the likelihood of failure in the electric power system that may cause interruption of electric power and/or damage to the system or external objects proximate the electric power system.

Due to the critical nature of electric power systems, protection and monitoring by the IEDs may assist in avoiding disruption of power systems. However, protection related functions in the IEDs may take up as little as 5 to 10% of computing resources (e.g., firmware), while non-protective functions take up relatively more, a majority of, or even all the remaining resources. Such non-protective functions may include, for example, supervisory control and data acquisition (SCADA) communications, other communications, event reporting, metering, diagnostics, and time management protocols.

It is generally accepted that the number of vulnerabilities, flaws, or bugs in computer code grows with the number of lines of code being implemented in a system. Estimates range from about 15 to 50 bugs per 1000 lines of code. With a monolithic (e.g., non-partitioned) firmware architecture, a bug in any part of the system may cause the entire system to fail. Thus, running code associated with functions unrelated to protection functions (e.g., event reporting, time management protocols, etc.) within an IED that is also running code for protective function may render the protection functions provided by the IED less reliable due to the greater complexity and higher number of errors, which could result in misoperation of the device. Such errors may be vulnerabilities that could be exploited to gain unauthorized access to the IED, and such unauthorized access may be used to shut down portions of the electric power system through intentional or unintentional misoperation.

One solution to this problem may include a full-featured operating system (e.g., Linux, Unix, QNX, VXWorks, etc.) in IEDs that isolates applications from each other. For example, on a system with a multicore processor, the operating system may determine which function runs on which core of the processor at run-time (e.g., via symmetrical multi-processing). While certain functions may be isolated from other functions in such a system, the system still relies on the hundreds of thousands of lines of code that are necessary to run the complex operating system. The complexity associated with such large operating systems may create additional security risks and require frequent updates to patch vulnerabilities.

According to embodiments of the disclosure, IEDs (e.g., relays) may include architecture in which protective functions (i.e., those functions associated with operation of the electric power delivery system) are isolated from non-protective functions (i.e., those functions not associated with operation of the electric power delivery system). Such architecture may include multiple processing devices (e.g., in a multicore processing device or through several individual processors) along with memory management or protection. The system may be partitioned into several applications (e.g., subsystems, executables, etc.) where each application runs on a different processor (e.g., asymmetrical multi-processing). The system memory may be partitioned at boot time to use a memory management unit (MMU) or memory protection unit to prevent applications from accessing memory containing other applications' code and data.

In accordance with some embodiments of the disclosure, protective functions may run in their own application, either with or without an operating system. For example, the protective function may operate in isolation from a majority or entirety of other functions or applications including the operating system. Such an application may primarily only perform protective functions. The code for the protective function applications may be made as relatively simple and small as possible (e.g., as compared with code for relatively more complex systems, such as an operating system, or an aggregate of code for multiple other functions and applications). Thus, in such a system with the ability to isolate the protective functions, the reliability of the protective functions may not be dependent on the quality of the code associated with features in the relays that are tasked with performing monitoring and protective functions. For example, in such a configuration, a fault on one of the processors or a portion thereof (e.g., one of the processor cores) running non-protective functions may cause that processor to be restarted or otherwise remedied. However, the protective functions may remain substantially unaffected and continue to operate in a reliable manner. Accordingly, the power system supported by the protective functions may remain unaffected. In some embodiments, functions related to protection (e.g., diagnostic functions, alarm functions, etc.) may also be executed along with protection functions. In such embodiments, the code related to such functions may be limited to certain functions.

Various embodiments consistent with the present disclosure may operate in connection with embedded systems. Embedded systems are designed to do a specific task (e.g., monitoring a portion of an electric power system). Embedded systems consistent with the present disclosure may be designed to provide high reliability and high security.

In some embodiments, protective functions may run on a portion of a processing device, where the processing device may include one processor with multiple sections (e.g., a multicore processor) and/or multiple processors (e.g., an array of processors). For example, the protection elements may collectively or separately run on different processors or on different, isolated portions of a single processor where the protective functions are at least partially isolated from other functions performed by the processor(s).

With such isolation of the protective functions, a particular protective element of the system (e.g., running an isolated processor or portion thereof, device, etc.) may continue to provide uninterrupted protection to the electric power system, while one or more other elements of the device experience an error and/or are restarted. For example, a first protective function (e.g., a distance or impedance element) may be running on a first processor (e.g., an individual processor or a first portion of the processor), an overcurrent element may be running on a second processor (e.g., an individual processor or second portion of the processor), and an underfrequency element (e.g., abnormal frequency) may be running on a third processor (e.g., an individual processor or third portion of the processor). During unavailability of the second processor and third processor for any reasons (e.g., firmware upgrade, computer failure, etc.), the first processor may continue to provide at least some of the protection for the electrical system (e.g., one or more transmission lines being monitored for impedance changes by the distance element).

Modern electric power protection systems are integrated with automation, monitoring, and supervisory systems, all of which interact through digital communication. Embodiments of the present disclosure may provide relatively more reliable electric power protection system functions including automation, monitoring, and supervisory systems that effectively operate under normal operating conditions, where some of the functions (e.g., selected protective functions) to the power system may continue to operate when there is a fault, error, or other unavailability in the other systems (e.g., the automation, non-protective monitoring, communication, general control systems, and other supervisory systems). Such protection devices and systems may be segregated such that protective functions or operations take place in at least partial isolation (e.g., on common or segregated equipment) and do not rely on, or operate in unison with, other non-protective functions and/or general operating systems.

In some embodiments, and as discussed above, the separation of such functions may be implemented within the same device at a processor level. Such an approach may be particularly useful for scenarios where installing two or more separate devices may not be possible (e.g., due to physical space constraints, other constraints on overall system size, etc.).

While protective functions are primarily discussed herein as being separated from other functions, in additional embodiments, any desired first set of functions may be isolated from other functions in accordance with embodiments of the disclosure.

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor do the steps need to be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations. For example, throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Several aspects of the embodiments disclosed herein may be implemented as software modules or components. As used herein, a software module or component may include any type of computer instruction or computer executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory machine-readable medium having stored thereon instructions that may be used to program a computer or other electronic device to perform processes described herein. The non-transitory machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable media suitable for storing electronic instructions. In some embodiments, the computer or another electronic device may include a processing device such as a microprocessor, microcontroller, logic circuitry, or the like. The processing device may further include one or more special-purpose processing devices such as an application specific interface circuit (ASIC), PAL, PLA, PLD, field programmable gate array (FPGA), or any other customizable or programmable device.

Electrical power systems are designed to generate, transmit, and distribute electrical energy to loads. Electrical power systems may include equipment, such as electrical generators, electrical motors, power transformers, power transmission, and distribution lines, circuit breakers, switches, buses, transmission lines, voltage regulators, capacitor banks, and the like. Such equipment may be monitored, controlled, automated, and/or protected using intelligent electronic devices (IEDs) that receive electrical power system information from the equipment, make decisions based on the information, and provide monitoring, control, protection, and/or automation outputs to the equipment.

In some embodiments, an IED may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communication processors, computing platforms, programmable logic controllers (PLCs), programmable automation controllers, input and output modules, governors, exciters, statcom controllers, static VAR compensator (SVC) controllers, on-load tap changer (OLTC) controllers, and the like. Further, in some embodiments, IEDs may be communicatively connected via a network that includes, for example, multiplexers, routers, hubs, gateways, firewalls, and/or switches to facilitate communications on the networks, each of which may also function as an IED. Networking and communication devices may also be integrated into an IED and/or be in communication with an IED. As used herein, an IED may include a single discrete IED or a system of multiple IEDs operating together.

The electrical power system may be monitored, controlled, automated, and/or protected using intelligent electronic devices (IEDs). In general, IEDs in an electrical power system may be used for protection, control, automation, and/or monitoring of equipment in the system. For example, IEDs may be used to monitor equipment of many types, including electrical transmission lines, electrical distribution lines, current transformers, buses, switches, circuit breakers, reclosers, transformers, autotransformers, tap changers, voltage regulators, capacitor banks, generators, motors, pumps, compressors, valves, and a variety of other types of monitored equipment.

In various embodiments, IEDs may be configured to monitor the frequency of alternating current waveforms, voltage levels, current levels (e.g., overcurrent and/or undercurrent), or other electrical conditions in the electrical power system. A network may be used to transmit information among various components in the electrical power system, including IEDs. In various embodiments, the network may be configured to provide streaming measurements that may be analyzed consistent with the present disclosure to detect anomalies.

A common time signal may be used to time-align measurements for comparison and/or to synchronize action across the electrical power system. Utilizing a common or universal time source may ensure that IEDs have a synchronized time signal that can be used to generate time-synchronized data, such as synchrophasors. In various embodiments, the common time source may comprise a time signal from a global navigation satellite system (GNSS) system. An IED may include a receiver configured to receive the time signal from the GNSS system. In various embodiments, the IED may be configured to distribute the time signal to other components in the electrical power system, such as other IEDs.

Figure 1:
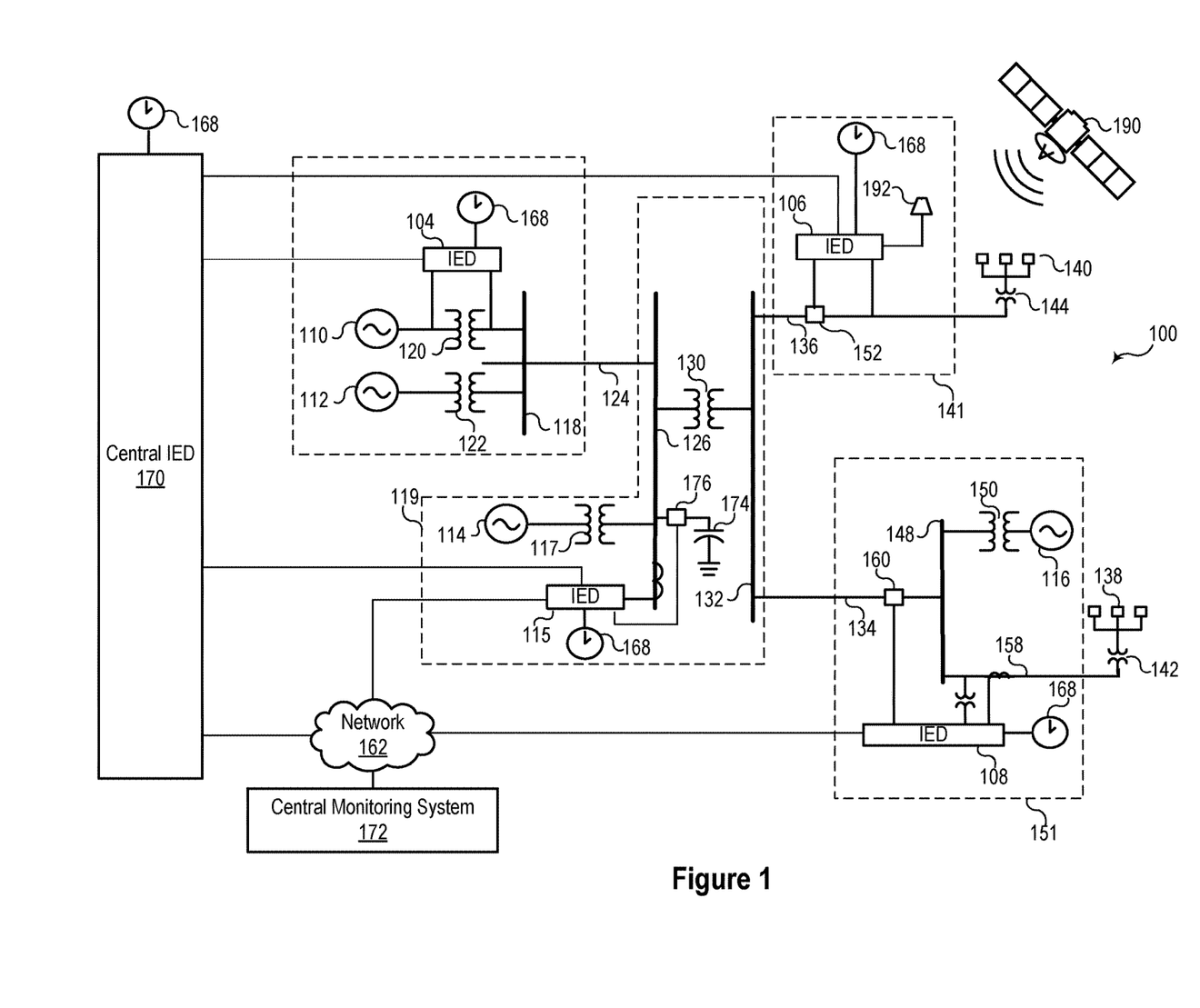
FIG. 1 illustrates a simplified one-line diagram of an electrical power delivery system consistent with embodiments of the present disclosure.

FIG. 1 illustrates a simplified one-line diagram of an electrical power delivery system 100 consistent with embodiments of the present disclosure. Electrical power delivery system 100 may be configured to generate, transmit, and distribute electrical energy to loads. Electrical power delivery systems may include equipment such as electrical generators (e.g., generators 110, 112, 114, and 116), power transformers (e.g., transformers 117, 120, 122, 130, 142, 144 and 150), power transmission and delivery lines (e.g., lines 124, 134, 136, and 158), circuit breakers (e.g., breakers 152, 160, 176), buses (e.g., buses 118, 126, 132, and 148), loads (e.g., loads 140 and 138) and the like. In various embodiments, the electrical generators 110, 112, 114, and 116 may comprise distributed generation sources (e.g., solar or wind generation). A variety of other types of equipment may also be included in electrical power delivery system 100, such as voltage regulators, capacitor banks, and the like.

Substation 119 may include a generator 114, which may be a distributed generator, and which may be connected to bus 126 through step-up transformer 117. Bus 126 may be connected to a distribution bus 132 via a step-down transformer 130. Various distribution lines 136 and 134 may be connected to distribution bus 132. Distribution line 136 may lead to substation 141 where the line 136 is monitored and/or controlled using IED 106, which may selectively open and close breaker 152. Load 140 may be fed from distribution line 136. Further, step-down transformer 144 in communication with distribution bus 132 via distribution line 136 may be used to step down a voltage for consumption by load 140.

Distribution line 134 may lead to substation 151, and deliver electrical power to bus 148. Bus 148 may also receive electrical power from distributed generator 116 via transformer 150. Distribution line 158 may deliver electrical power from bus 148 to load 138, and may include further step-down transformer 142. Circuit breaker 160 may be used to selectively connect bus 148 to distribution line 134. IED 108 may be used to monitor and/or control circuit breaker 160 as well as distribution line 158.

Electrical power delivery system 100 may be monitored, controlled, automated, and/or protected using IEDs, such as IEDs 104, 106, 108, 115, and 170, and a central monitoring system 172. In general, IEDs in an electrical power generation and transmission system may be used for protection, control, automation, and/or monitoring of equipment in the system. For example, IEDs may be used to monitor equipment of many types, including electrical transmission lines, electrical distribution lines, current transformers, buses, switches, circuit breakers, reclosers, transformers, autotransformers, tap changers, voltage regulators, capacitor banks, generators, motors, pumps, compressors, valves, and a variety of other types of monitored equipment.

An IED (such as IEDs 104, 106, 108, 115, and 170) may refer to any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

Central monitoring system 172 may comprise one or more of a variety of types of systems. For example, central monitoring system 172 may include a supervisory control and data acquisition (SCADA) system and/or a wide area control and situational awareness (WACSA) system. A central IED 170 may be in communication with IEDs 104, 106, 108, and 115. IEDs 104, 106, 108 and 115 may be remote from the central IED 170, and may communicate over various media such as a direct communication from IED 106 or over a wide-area communications network 162. According to various embodiments, certain IEDs may be in direct communication with other IEDs (e.g., IED 104 is in direct communication with central IED 170) or may be in communication via communication network 162 (e.g., IED 108 is in communication with central IED 170 via communication network 162).

As discussed above and in further detail below, one or more of the IEDs 104, 106, 108, 115, and 170 may be configured to run selected functions separately (e.g., on different processors of a processing device). For example, one or more functions (e.g., functions of relative higher priority, such as protective functions) may be segregated from one or more other functions (e.g., operating systems, communications, SCADA, etc.). One or more of the protective functions (e.g., overcurrent, differential, directional, distance, undervoltage, voltage regulation, bus protection, overfrequency, underfrequency, traveling wave, and other protection operations) for one or more portions of the electric power system (e.g., the feeders, the buses, the transformers, etc.) may operate on a first processor of the respective IED (e.g., on a core of a common processor or on an individual processor) while one or more other functions may operate on other processors (e.g., on another core of a common processor or on another individual processor). Where more than one protective function is implemented, the protective functions may be executed separately as a group or on several isolated processors.

A common time signal 168 may be used to time-align measurements for comparison and/or to synchronize actions across system 100. Utilizing a common or universal time source may ensure that IEDs have a synchronized time signal that can be used to generate time-synchronized data, such as synchrophasors. In various embodiments, the common time source 168 may comprise a time signal from a GNSS system 190. IED 106 may include a receiver 192 configured to receive the time signal from the GNSS system 190. In various embodiments, IED 106 may be configured to distribute the time signal to other components in system 100, such as IEDs 104, 108, 115, and 170.

In various embodiments, wireless current sensors may be utilized in system 100 to measure electrical parameters in system 100. Such measurements may be utilized by various control systems to implement control actions in system 100. In one specific embodiment, wireless current sensors may be utilized in connection with distribution equipment, such as capacitor bank controls and other equipment that rely on phasor data for operation. Such systems may measure the degree to which the voltage of the power system is out of phase with the current of the system. Reactive power support may be provided by selectively connecting a capacitor bank 174 to system 100 using a breaker 176.

Figure 2:
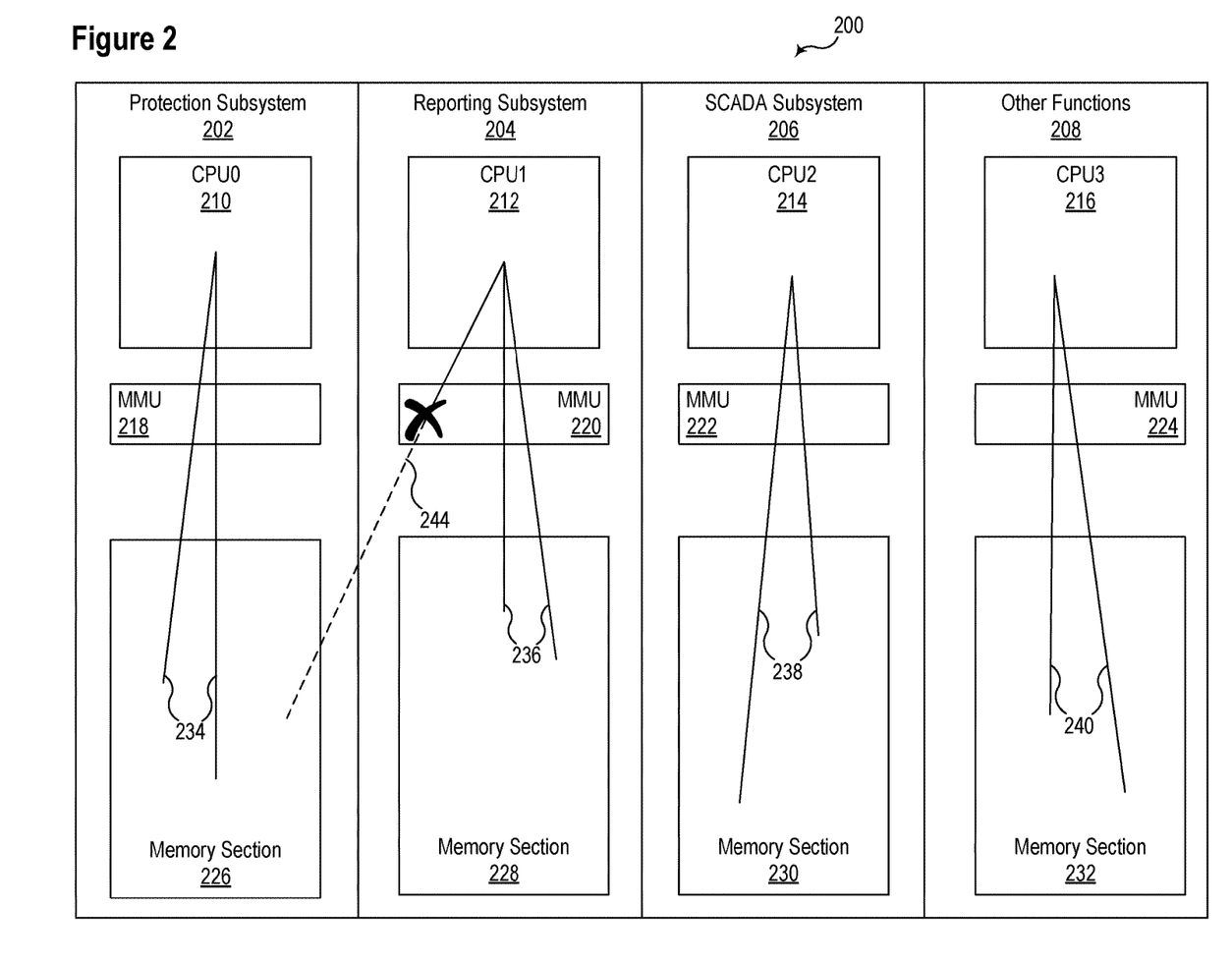
FIG. 2 illustrates a simplified representation of a system for use in an electric power system to perform a plurality of functions consistent with embodiments of the present disclosure.

FIG. 2 illustrates a simplified representation of a system 200 for use in an electric power system to perform a plurality of functions consistent with embodiments of the present disclosure. System 200 includes a protection subsystem 202, a reporting subsystem 204, a SCADA subsystem 206, and other functions 208. As illustrated, each subsystem includes a CPU, a memory management unit (MMU), and memory. The protection subsystem 202 may execute code stored on memory 226 using CPU0 210. MMU 218 may enable requests 234 to access memory 226. The operation of protection subsystem 202 may be independent of the other subsystems in system 200, and the other subsystems may not have access to memory 226. For example, reporting subsystem 204 may operate using CPU1 212. MMU 220 may allow requests 236 to access memory 228, but may block a request 224 to access information from memory 226.

The isolation of CPUs 210, 212, 214, and 216, and memories 226, 228, 230, and 230 may allow each subsystem 202, 204, 206, and 208, to operate independently and provide improved security. Such security may in part be realized because each MMU 218, 220, 222, and 224 may only enable code operating on a CPU to access an associated memory section, and may block or disable any requests to access memory outside of an associated memory section.

The subsystems illustrated in FIG. 2 may be embodied in a variety of ways in different embodiments. In one embodiment, system 200 may include physically distinct processors and memory sections. In other embodiments, resources of a single system may be physically shared and logically separated. For example, each CPU may be a core of a multi-core processor, and each memory section may be a portion of a larger memory array.

Figure 3:
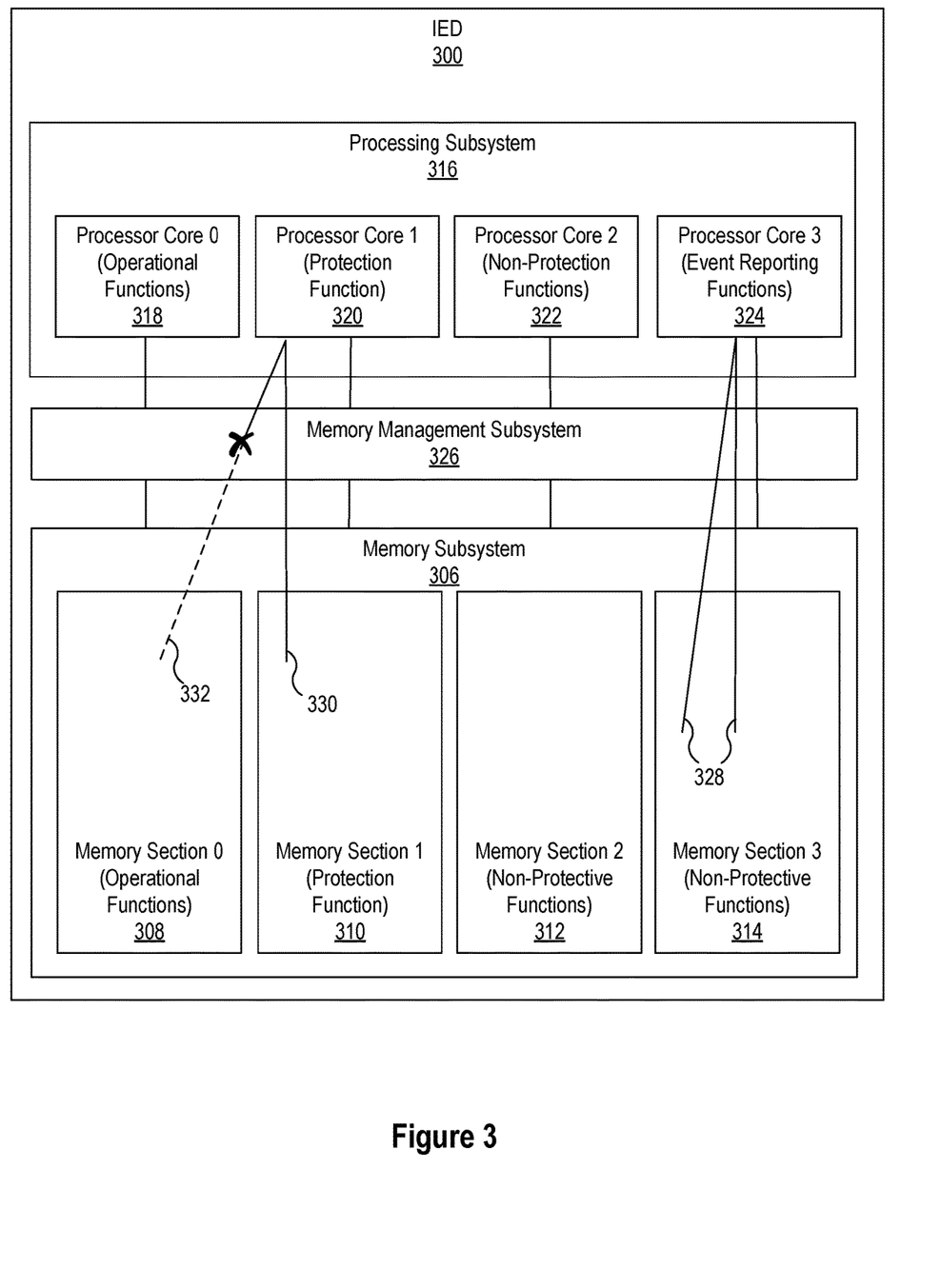
FIG. 3 illustrates a simplified representation of a protective intelligent electronic device (IED) for use in an electric power system and in which system resources are allocated to a plurality of functions consistent with embodiments of the present disclosure.

FIG. 3 illustrates a simplified representation of an IED 300 for use in an electric power system and in which system resources are allocated to a plurality of functions consistent with embodiments of the present disclosure. IED 300 may perform one or more protective functions (e.g., a transformer protection relay, a bus protection relay, and/or a feeder protection relay). The IED 300 may be in communication with other IEDs (e.g., as depicted above in FIG. 1) to receive power system information, for example, such as currents and/or voltages from the power system (e.g., from potential transformers (PT), current transformers (CT), etc.), along with communications, alerts, etc.

As depicted, the IED 300 may include a processing subsystem 316, a memory subsystem 306, and a memory management subsystem 326. In the processing subsystem 316, each processor core 318, 320, 322, and 324 may be dedicated to a function. Processor core 0 318 may execute tasks relating to the management and allocation of hardware, software resources, and provision of common services for other functions of the IED 300. Processor core 1 320 may be dedicated to protection functions relating to monitoring and/or controlling one or more aspects of the electrical power system, such as those discussed above. Processor core 2 322 may execute code that is not directly related to the protective functions, such as SCADA communications, communications between multiple IEDs, event reporting, and time management protocols. Processor core 3 324 may execute code related to event reporting.

The IED 300 may include system memory 306 that may be partitioned (e.g., at startup of the IED 200) into sections allocated to a particular function or CPU. In the illustrated embodiment, memory section 0 308 is associated with processor core 0 318, memory section 1 310 is associated with processor core 1 320, memory section 2 312 is associated with processor core 2 322, and memory section 3 314 is associated with processor core 3 324.

The resources of processing subsystem 316 and memory subsystem 306 may be permanently allocated to a particular function or may be allocated for a period of time and then reassigned or unassigned as necessary. The processing subsystem 316 may collectively define a single processing device or unit with multiple sections (e.g., a multicore processor, such as two, four, six, eight, or more core processor) and/or multiple processors (e.g., an array of processors).

A memory management subsystem 326 may selectively grant or deny access to information stored in memory subsystem 306 to code executing on processing subsystem 316. For example, memory management subsystem 326 may allow requests 328 for information stored in memory section 3 314. Similarly, memory management subsystem 326 may allow a request 330 to access information stored in memory section 1 310; however, memory management subsystem 326 may block a request 332 to access information stored in memory section 0 308. The memory management device 326 may comprise a single device, a plurality of devices for each subsystem, or combinations thereof.

Figure 4:
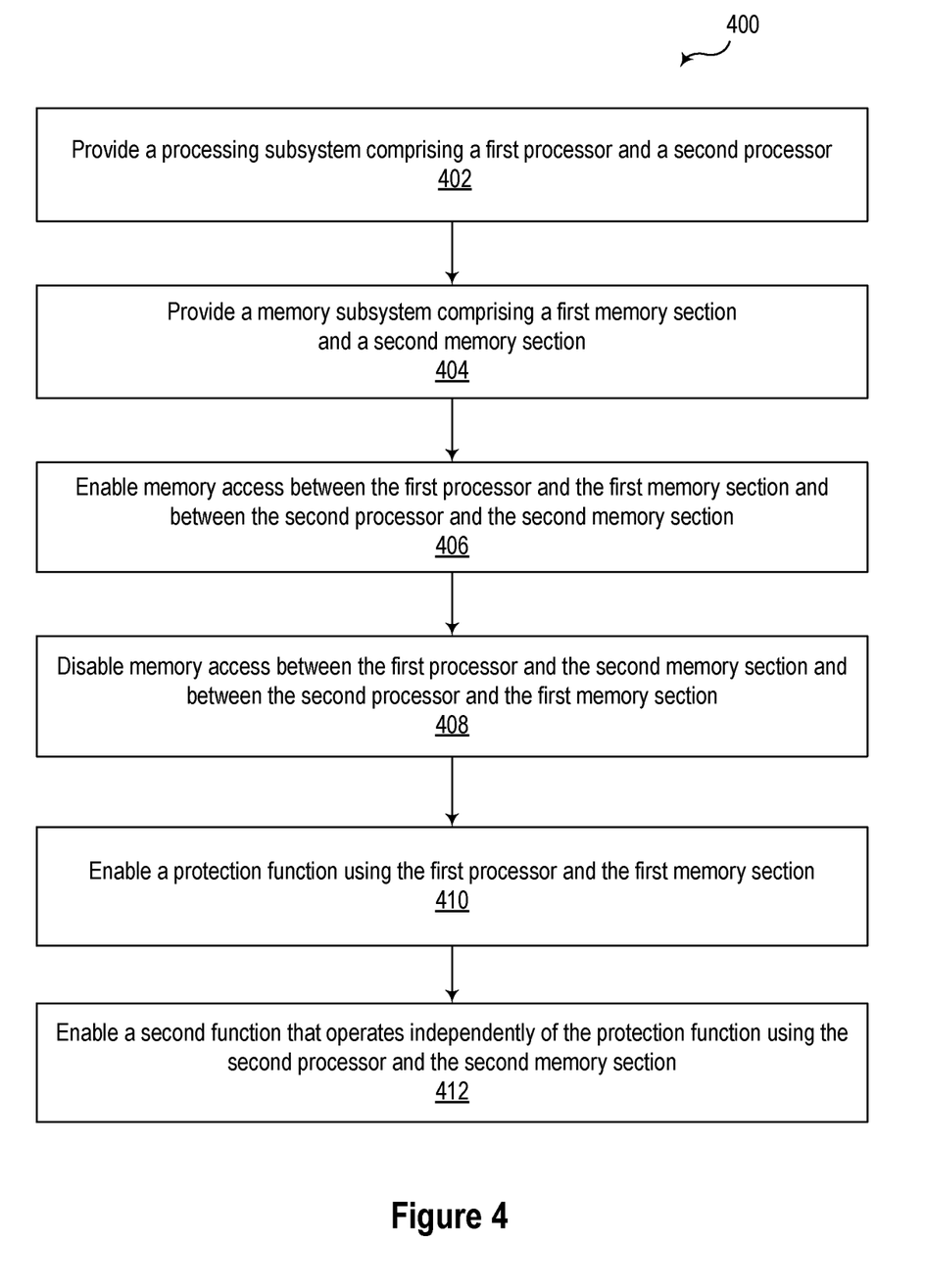
FIG. 4 illustrates a flow chart of a method of operating a protective IED in an electric power system consistent with embodiments of the present disclosure.

FIG. 4 illustrates a flow chart of a method 400 of operating a protective IED in an electric power system. At 402, a first processor and a second processor may be provided. In some embodiments, the first processor and the second processor may be embodied as CPU0-CPU3 210-216 in FIG. 2 or processing subsystem 316 in FIG. 3. Such systems may be used in an electric power system, such as the electric power system 100 illustrated in FIG. 1.

At 404, a memory subsystem comprising a first memory section and a second memory section may be provided. The memory subsystem may comprise a plurality of physically discrete memory elements corresponding to the first memory section and the second memory section. In other embodiments, a single computer-readable medium may comprise logical divisions corresponding to the first memory section and the second memory section. In various embodiments, the memory sections may be embodied as memory sections 226-232 in FIG. 2 or as memory sections 0-3 308-314 in FIG. 3.

At 406, memory access between the first processor and the first memory section and between the second processor and the second memory section may be enabled. Further, at 408, memory access between the first processor and the second memory section and between the second processor and the first memory section may be disabled. Memory access may be enabled by a memory management unit or subsystem, such as memory management units 218-224 in FIG. 2 or memory management subsystem 326 in FIG. 3.

At 410, a protection function may be enabled using the first processor and the first memory section. In various embodiments, the protection function may comprise an overcurrent protective function, a differential protective function, a directional protective function, a distance protective function, an undervoltage protective function, a voltage regulation protective function, a bus protective function, an overfrequency protective function, an underfrequency protective function, or a traveling wave protective function.

At 412, a second function that operates independently of the protection may be enabled using the second processor and the second memory section. In various embodiments, the second function may comprise supervisory control and data acquisition (SCADA) communications, communications between multiple IEDs, event reporting, metering, or time management protocols. The second function may operate independently of the first function, such that the second function may be updated, restarted, or suffer a fault without interrupting the first function.

While specific embodiments and applications of the disclosure have been illustrated and described, it is to be understood that the disclosure is not limited to the specific configurations and components disclosed herein. Accordingly, many changes may be made to the details of the above-described embodiments without departing from the underlying principles of this disclosure. The scope of the present invention should, therefore, be determined only by the following claims.

What is claimed is:

1. An intelligent electronic device (IED) for use in an alternating current electrical power system, the IED comprising:
   a processing subsystem comprising at least a first processor and a second processor, the first processor and the second processor to operate independently;
   a memory subsystem comprising a first memory section and a second memory section;
   a memory management subsystem in communication with the processing subsystem to:
      enable memory access between the first processor and the first memory section;
      disable memory access between the first processor and the second memory section;
      enable memory access between the second processor and the second memory section; and
      disable memory access between the second processor and the first memory section;
   a protection subsystem comprising the first processor and the first memory section to enable one or more protection functions to at least a portion of the alternating current electrical power system that is external to the IED, wherein the first processor and the first memory section are dedicated to the protection system and only for use in enabling the one or more protection functions relating to the alternating current electrical power system; and
   wherein the second processor and the second memory section provide a second function, the second function to operate independently of the one or more protection functions, wherein the second processor and the second memory section are dedicated to one or more subsystems independent of the protection system and only for use in enabling non-protection functions relating to the alternating current electrical power system.

2. The IED of claim 1, wherein the first processor and the second processor each comprise one processor core of a single multicore processor.

3. The IED of claim 1, wherein the first processor and the second processor each comprise a separate processing unit.

4. The IED of claim 1, wherein the processing subsystem comprises an asymmetric multiprocessing subsystem.

5. The IED of claim 1, wherein the processing subsystem, the memory subsystem, and the memory management subsystem comprise an embedded system.

6. The IED of claim 1, wherein the one or more protection functions comprise at least one of an overcurrent protective function, a differential protective function, a directional protective function, a distance protective function, an undervoltage protective function, a voltage regulation protective function, a bus protective function, an overfrequency protective function, an underfrequency protective function, or a traveling wave protective function.

7. The IED of claim 1, wherein the second function is operable to perform one of an update or a restart without interruption of the protection function.

8. The IED of claim 1, wherein the second function comprises one of supervisory control and data acquisition (SCADA) communications, communications between multiple IEDs, event reporting, metering, or time management protocols.

9. The IED of claim 1, wherein the first memory section and the second memory section each comprise a logical subsection of a computer readable medium.

10. The IED of claim 1, wherein the first memory section and the second memory section each comprise a separate computer readable medium.

11. A method of operating an intelligent electronic device (IED) in an alternating current electrical power system, the method comprising:
providing a processing subsystem comprising a first processor and a second processor, the first processor and the second processor to operate independently;
providing a memory subsystem comprising a first memory section and a second memory section;
enabling memory access between the first processor and the first memory section;
disabling memory access between the first processor and the second memory section;
enabling memory access between the second processor and the second memory section;
disabling memory access between the second processor and the first memory section;
detecting a fault in at least a portion of the alternating current electrical power system that is external to the IED with a protection subsystem of the IED;
enabling, using the protection subsystem comprising the first processor and the first memory section, one or more protection functions responsive to the fault in the at least a portion of the alternating current electrical power system, wherein the first processor and the first memory section are dedicated to the protection system and only for use in enabling the one or more protection functions relating to the alternating current electrical power system; and
enabling, using the second processor and the second memory section, a second function related to a non-protective function that operates independently of the one or more protection functions.

12. The method of claim 11, wherein the first processor and the second processor each comprise one processor core of a single multicore processor.

13. The method of claim 11, wherein the first processor and the second processor each comprise a separate processing unit.

14. The method of claim 11, wherein the processing subsystem comprises an asymmetric multiprocessing subsystem.

15. The method of claim 11, wherein the processing subsystem, the memory subsystem, and the memory management subsystem comprise an embedded system.

16. The method of claim 11, wherein the one or more protection functions comprise at least one of an overcurrent protective function, a differential protective function, a directional protective function, a distance protective function, an undervoltage protective function, a voltage regulation protective function, a bus protective function, an overfrequency protective function, an underfrequency protective function, or a traveling wave protective function.

17. The method of claim 11, further comprising the second function performing one of an update or a restart without interrupting the protection function.

18. The method of claim 11, wherein the second function comprises one of supervisory control and data acquisition (SCADA) communications, communications between multiple IEDs, event reporting, metering, or time management protocols.

19. The method of claim 11, wherein the first memory section and the second memory each comprise a logical subsection of a computer readable medium.

20. The method of claim 11, wherein the first memory section and the second memory section each comprise a separate computer readable medium.

* * * * *